United States Patent Office 3,308,970
Patented Mar. 14, 1967

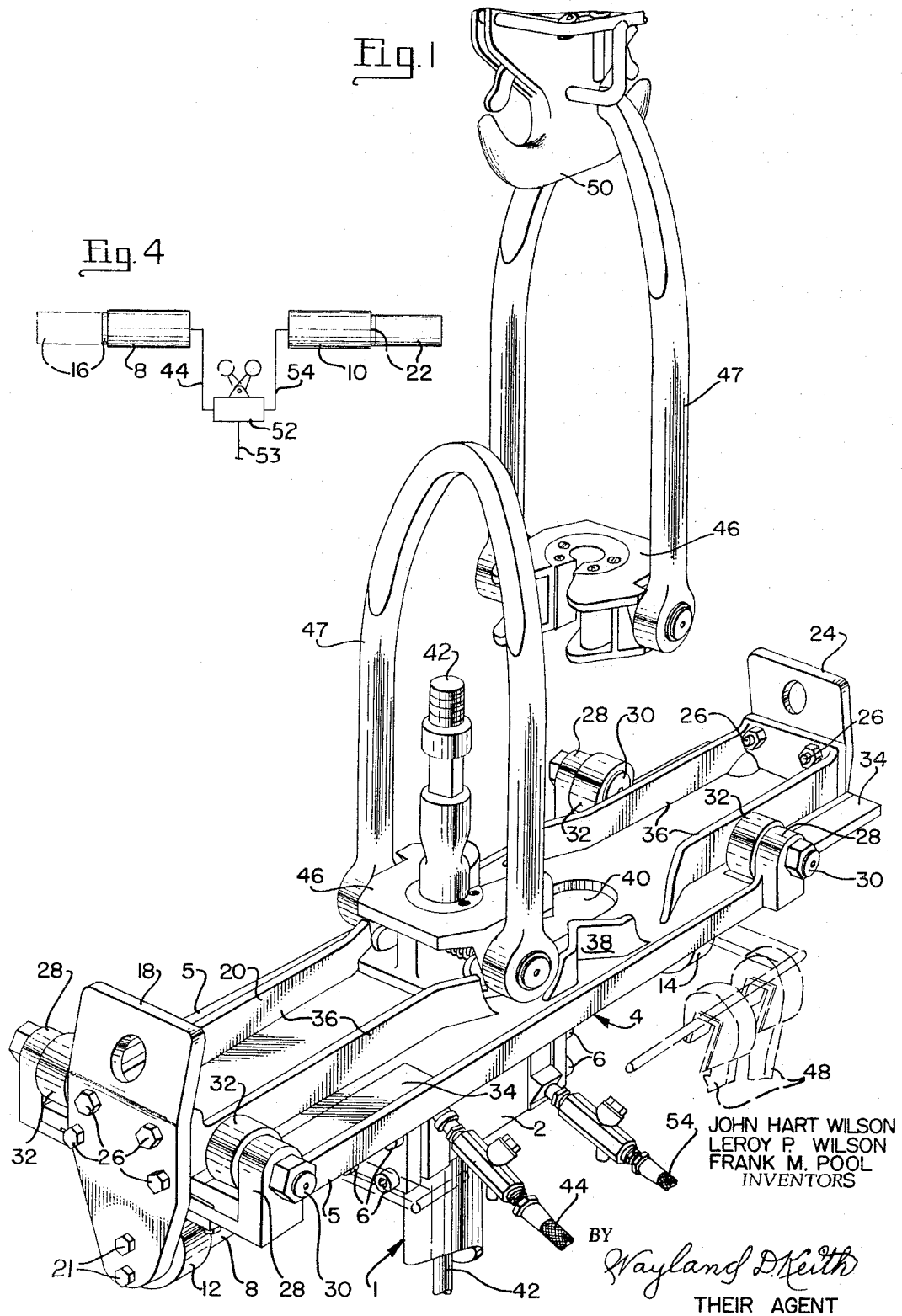

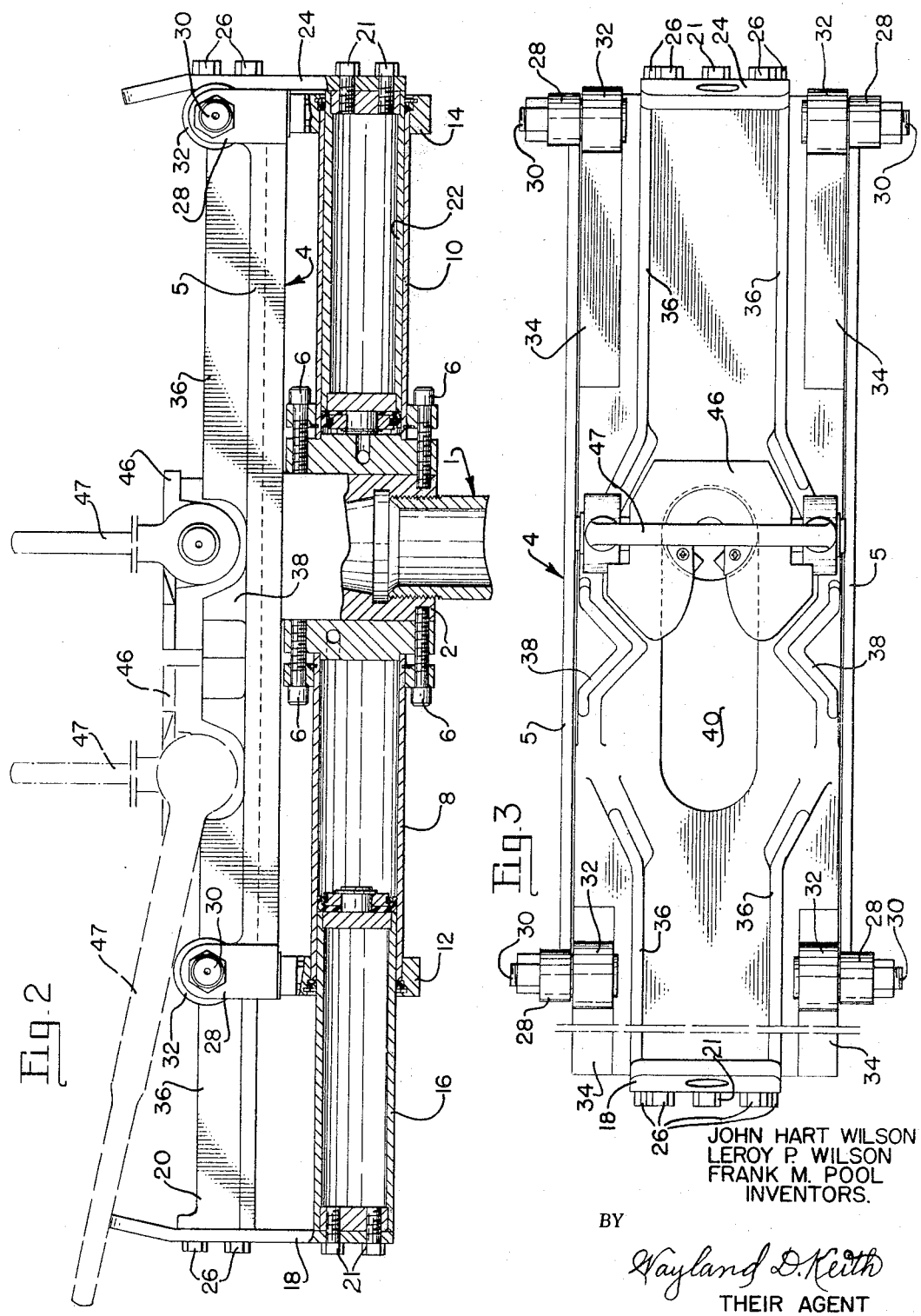

3,308,970
ROD AND PIPE ELEVATOR SHIFTING MECHANISM FOR WELL SERVICING RIGS AND THE LIKE
John Hart Wilson and Leroy P. Wilson, both c/o Wilson Mfg. Co., P.O. Box 1031, Wichita Falls, Tex. 76307, and Frank M. Pool, P.O. Box 1940, San Angelo, Tex. 76901
Filed June 10, 1965, Ser. No. 462,861
10 Claims. (Cl. 214—2.5)

This invention relates to a mechanism for handling elevators used in pulling an elongated element, such as rods or pipe from wells, and more particularly to a mechanism for shifting elevators in such manner that two elevators may be used alternately in pulling the elongated elements, such as rods or pipe and the like from wells.

It has been the usual practice, heretofore, in pulling an elongated element, such as rods or pipe, from a well, to use two elevators, and when one elevator was lowered it was laid on a table, or the like, and a single hook disconnected therefrom and connected to an elevator attached to an elongated element, such as a rod or pipe, the length of rod, pipe, or the like was withdrawn and supported in the derrick. The elevator was then disconnected and lowered onto a table or support, the like procedure was followed with each length of rod or pipe being withdrawn and racked in a rod or pipe rack within the derrick until the work was completed. This necessitated handling each elevator manually, disconnecting the elevator and moving the disconnected elevator below an abutment, such as a rod joint or a pipe collar when the length of rod or pipe was withdrawn to the proper height. This was a laborious and time consuming process for which two men are required, if the work is to proceed expeditiously. When running the elongated element, such as rod or pipe, into a well, the opposite procedure was practiced.

In the present invention, and elevator shift mechanism is provided on the upper end of the well tubing or casing, which provides seats for elevators, and when one elevator is lowered, it is seated in one of the elevator seats on the shift mechanism and the bail of the elevator is moved out of a hook of the double hook arrangement and the bail of the other elevator, in which the rod is positioned, is swung into the other hook of the double hook arrangement to enable the lifting of the rod upwardly within the mast or derrick, without the necessity of manually handling the elevators, in this manner the elevators may be used alternately. However, since the rod or pipe being withdrawn from or run into the well must be in alignment therewith, it is desirable to center the elevator over the well to withdraw pipe or to run pipe into a well. However, while one elevator, of the present arrangement, is being used to handle the pipe or rod, the other elevator is positioned on a shift plate, in opposed relation to the position which was previously occupied by the elevator handling the rod or pipe, whereupon, at the proper time, the elevator positioned on the shift plate is moved from a position out of alignment with the axis of the rod or pipe being operated upon to a position around the rod or pipe and below an abutment thereon so as to support the rod or pipe when it is detached from the rod or pipe being pulled from the well.

The present drawings disclose the elevators being used with rods; however, it is to be understood that this is for the purpose of illustration, and the present device is to be considered equally applicable to pipe, therefore, to avoid repetitiousness, the device will be described primarily for use with pump rods.

An object of the invention is to provide an elevator shifting mechanism which will enable the use of two elevators for removing elongated elements, such as rod or pipe, from a well, or the running of such elongated elements into a well, wherein the two elevators are used for alternate operations.

Another object of the invention is to enable the placing of an elevator around a pipe by the use of a fluid actuated mechanism.

Still another object of the invention is to provide a mechanism to enable two elevators to be used alternately in the pulling of rods or pipe from a well and in running the rods or pipe thereinto.

Yet another object of the invention is to provide a movable shift plate on which the two elevators may be seated in opposed relation alternately, and an elevator moved, by mechanical means and at the proper time, to surround the rods or pipe, thereby to expedite removing rods or pipe from a well or the running of the rods or pipe thereinto.

A further object of the invention is to provide a mechanism which enables a pair of elevators to be suspended by a double hook in such manner that the elevators may be detached from the hook or attached thereto, alternately, while pulling rods or pipe from a well or while running rods or pipe thereinto.

Still another object of the invention is to provide an air actuated mechanism for shifting a shift plate on which elevators are seated, to enable the alignment of an elevator with the axis of the rods or pipe being removed from or run into a well.

Still another object of the invention is to provide an elevator shifting device for moving the elevators laterally alternately.

A still further object of the invention is to be able to handle the elevators alternately with a minimum of manual effort and making it possible to use only one man on the floor, while pulling rods.

Still another object of the invention is to speed up the operation of pulling rods or pipe, thereby reducing the cost of this operation.

A final object of the invention is to provide an elevator shifting mechanism which is simple in construction, easy to operate and to manufacture, and which is relatively trouble free in operation.

With these objects in mind and others which will become manifest as the description proceeds, reference is to be had to the accompanying drawings in which like reference characters designate like parts in the several views thereof in which:

FIG. 1 is a perspective view of an elevator shifting mechanism attached to the upper end of a well tubing, showing a rod extending upward thereto, showing an elevator in place on the shifting mechanism to support the rod, with the second elevator on a double hook traveling block being lowered into place, and showing a rod wrench rack and rod wrenches in dashed outline, with portions thereof being broken away;

FIG. 2 is a side elevational view of an elevator shifting mechanism, with parts broken away and with parts shown in section, and with parts shown in phantom view, in dashed outline, alternate positions of one of the elevators also being shown in dashed outline;

FIG. 3 is a top plan view of the elevator shift mechanism with parts thereof being broken away and shortened, and showing one of the elevators in full outline positioned thereon; and FIG. 4 is a diagrammatic view of a fluid actuating system to perform the shifting operations on the mechanism.

With more detailed reference to the drawings, the numeral 1 designates generally the upper end of an elongated element, such as tubing or pipe, upon which a boss 2 is screwed. The boss 2 is associated with the lower side of a base plate, and may be made integral therewith, which base plate is designated generally at 4. Cylinders 8 and 10 are provided, which cylinders are secured to the boss 2 by means of bolts 6, as will best be seen in FIG. 2. The base plate 4 extends outward from each end of boss 2 and has downwardly extending support members 12 and 14 on the respective opposite ends thereof, which anchor and stabilize the respective outer ends of cylinders 8 and 10.

The cylinder 8 has a plunger 16 fitted therein, to which plunger is attached an upstanding plate 18, by cap screws 21, which upstanding plate is secured, at one end, to a shift plate 20 by bolts 26. The shift plate 20 is retained against sidewise or transverse movement by the upstanding ribs 5, which are positioned on each side of the base plate 4.

The cylinder 10 has a plunger 22 fitted therein, the distal end of which plunger has a plate 24 secured thereto by cap screws 21, which plate extends upward and is secured to shift plate 20 by means of bolts 26. Since upstanding plates 18 and 24 are secured to opposite ends of shift plate 20, which plate 20 is of greater length than base plate 4, one end of the shift plate 20 will extend beyond the end of the base plate 4 substantially the same amount as the respective plungers 16 and 22 extend from the respective cylinders 8 and 10.

Each end of the base plate 4 has an upstanding lug 28 on each side thereof. An axle, such as bolt 30, is mounted on each of lugs 28. Each axle extends inward over shift plate 20, each of which axle journals a roller 32 thereon, which rollers are above and in rolling contact with each side of the finished upper face 34 of shift plate 20, near each end thereof. The lower face of the shift plate 20 is machined to form a smooth sliding surface, which is in sliding engagement with a complementary smooth surface on the upper face of the base plate 4, between the upturned flanges 5 thereof.

The shift plate 20 has upstanding ribs thereon as indicated at 36 and 38, to form a pair of spaced apart, elevator receiving seats on the plate 20 intermediate the ends thereof. The shift plate 20 has an elongated slot 40 formed longitudinally therein, which slot 40 underlies at least a portion of each of the elevator receiving seats. The elongated slot 40, when the plate 20 is in one extreme position, will locate one of the elevators centrally over pipe 1, in which a rod 42 is positioned. When the shift plate 20 is shifted to the other extreme position, as will be brought out more fully hereinafter, the other of the elevator receiving seats will be positioned in aligned relation with the axis of pipe 1 in which rod 42 is positioned.

It is to be pointed out that, while one of the elevators is used to withdraw a rod or pipe from or to lower the rods or pipe into a well, the movement of the shift plate 20 may take place, without interference with the longitudinal movement of the rods or pipe being operated upon, as the slot 40 is of sufficient length to accommodate the full movement of the shift plate 20, which movement is actuated by air actuated plungers 16 and 22. The air, when directed through hose 44 into the end of cylinder 8, will move the plunger 16, upstanding member 18 and the shift plate 20 to bring elevator 46 into position to surround a rod or pipe, whereupon, in the case of withdrawing the rods from the well or running rods into a well, the rods may be lowered into seating relation on elevator 46 and proper action taken with wrenches 48, or if desired, an automatic unscrewing apparatus may be used to unscrew the threads, whereupon the derrick man, who receives the rods, lifts the rods by means of a transfer elevator (not shown) while the rod elevator that has been removed from the rod is being returned to the derrick floor, whereupon, as the rod elevator is being lowered, the derrick man has ample time to place a rod in a rod rack or a pipe in a pipe rack, and the elevator is lowered into an elevator receiving seat in opposed relation to the other elevator, whereupon, the bail 47 of the elevator 46 is moved from the position, as shown in dashed outline, to the position as shown in dot-dash outline in FIG. 2, and the other hook of a double elevator hook 50 is made ready to receive the elevator bail 47 to lift the other of the elevators, and the bail 47 of elevator 46, which has been lowered, is detached from hook 50 and moved to an out-turned position. The double elevator hook 50 is raised within the derrick or mast by a hoisting arrangement, and while the elevator is being moved upward, by manipulation of valve 52, air from air supply line 53 is directed into cylinder 8 through conduit 44 and air is released from cylinder 10 through conduit 54 and valve 52, whereupon, the elevator 46, which is seated on the shift plate 20, will be moved to engage around rod 42 to enable the rod to be removed from the well. The elevators are thus used alternately to withdraw rods from the well.

In order to run rods into a well, the above procedure is substantially reversed, as, after the elevator 46 is seated in one of the elevator receiving seats, the bail 47 thereof is laid over in a reclining position, as shown in dashed outline in FIG. 2, and an elongated element, such as a rod or a pipe, is screwed onto the element being held in the elevator, by the use of wrenches or by a power spinning device, whereupon, the rod is lifted slightly, then, with the elevator unlatched, the shift plate 20 is moved so that the elevator 46 will not surround the elongated element, which will enable the elongated element to be lowered into the well through slot 40 and pipe 1. When the elevator which is lowering the elongated element into the well seats upon the opposed elevator receiving seat, with the open side thereof facing the other elevator, the latches on the double hook 50 of the traveling block are released, and the bail 47 is moved into a reclining position, and the other hook of the double hook arrangement on the hoist line or traveling block is connected to the bail of the opposite elevator to elevate the empty elevator into the mast or derrick into position to receive another elongated element, such as a rod or pipe, and the operation is repeated.

Having thus clearly shown and described the invention, what is claimed as new and desired to be secured by Letters Patent is:

1. An elevator shifting mechanism for moving elevators transversely with respect to an elongated element within the bore hole of a well, which mechanism comprises;
    (a) a base plate,
        (1) said base plate having a hole formed therein, which hole is in alignment with the bore hole of a well,
    (b) a shift plate mounted on said base plate,
        (1) elevator receiving seats formed on said shift plate,
        (2) said shift plate having an elongated slot formed therein, which slot underlies a portion of each elevator receiving seat and being in register with said hole in said base plate,
    (c) mechanical means associated with said shift plate for moving said shift plate relative to said base plate.

2. An elevator shifting mechanism as defined in claim 1; wherein
    (a) said mechanical means for moving said shift plate is a fluid actuated cylinder mechanism, and
        (1) fluid control means for selectively directing fluid under pressure to said fluid actuated cylinder mechanism.

3. An elevator shifting mechanism as defined in claim 1; wherein
    (a) said mechanical means for shifting said shift plate is a pair of fluid actuated cylinders,
        (1) interconnecting means between said fluid cylinders and said shift plate to impart relative movement between said shift plate and said base plate, (b) valve control means to selectively direct fluid from one of said cylinders while directing fluid into the other of said cylinders.

4. An elevator shifting mechanism as defined in claim 1; wherein
(a) said shift plate is slidably mounted on said base plate, and
(b) wherein rollers are mounted on said base plate, which rollers retain said shift plate against relative upward movement with respect to said base plate, but which will permit free longitudinal movement of said shift plate with respect to said base plate.

5. An elevator shifting mechanism as defined in claim 1; wherein
(a) said base plate has means on the lower side thereof to secure it to the upper end of a pipe within a well.

6. An elevator shifting mechanism as defined in claim 1; wherein
(a) said shift plate has an upstanding wall around at least a portion of each elevator receiving seat; and
(1) means on said shift plate to receive the bail of an elevator, when an elevator is in waiting position on said elevator seat.

7. An elevator shifting mechanism for moving elevators transversely with respect to an elongated element within the bore hole of a well, which mechanism comprises;
(a) a base plate,
(b) a shift plate slidably mounted on the upper face of said base plate,
(1) a pair of elevator receiving seats formed on said shift plate,
(2) said base plate having a hole formed therein, which hole is in alignment with the bore hole of a well,
(3) said shift plate having an opening formed therein, which opening underlies a portion of each said elevator receiving seat and being in register with said hole in said base plate,
(c) a fluid actuated cylinder mechanism associated with said base plate and with said shift plate,
(1) fluid control means for selectively directing fluid under pressure into and from said fluid actuated cylinder mechanism,
(2) said fluid actuated cylinder mechanism being adapted to move said shift plate so one of said seats will be in aligned relation with said hole formed in said base plate when said shift plate is in one position and adapted to move said shift plate so that the other of said elevator receiving seats will be in aligned relation with the hole in said base plate, when said shift plate is in another position.

8. An elevator shifting mechanism for moving elevators transversely with respect to an elongated element within the bore hole of a well, which mechanism comprises;
(a) a base plate,
(1) said base plate having a downwardly extending boss formed on the lower side thereof,
(2) said base plate having a hole formed therein and through said boss, which hole is adapted to be in alignment with the bore hole of a well,
(3) said boss having screw threads formed within the hole therein to threadably engage a pipe,
(b) a shift plate mounted on said base plate and being movable relative thereto,
(1) a pair of elevator receiving seats formed on the upper side of said shift plate and adapted to receive elevators therein,
(2) said shift plate having an opening formed therein, which opening underlies a portion of each said elevator seat and is in register with the hole in said base plate,
(c) a fluid actuated cylinder mechanism,
(1) means associated with said base plate for attachment of one end of said fluid actuated cylinder mechanism,
(2) means on said shift plate for attachment of the other end of said fluid actuated cylinder mechanism,
(3) said fluid actuated cylinder mechanism being movable when fluid under pressure is applied thereto, so as to cause relative movement between portions of said fluid actuated cylinder mechanism to impart lineal movement between said base plate and said shift plate, and
(d) fluid control means for selectively directing fluid under pressure to said fluid actuated cylinder mechanism to selectively impart relative movement thereto and to said shift plate relative to said base plate.

9. An elevator shifting mechanism for moving elevators, as defined in claim 8; wherein
(a) hold down rollers mounted on said base plate in journaled relation and extend over said shift plate to maintain said shift plate against relative upward movement with respect to said base plate.

10. An elevator shifting mechanism as defined in claim 8, wherein
(a) said fluid actuated cylinder mechanism comprising two fluid cylinders each with a plunger therein,
(1) said respective fluid cylinders being associated with said base plate and being fixed against relative movement with respect thereto,
(2) the distal end of each plunger in the respective cylinders being associated with said shift plate and being fixed against relative movement with respect thereto, and
(b) said shift plate being of greater length than said base plate to permit longitudinal shifting of said shift plate.

References Cited by the Examiner

UNITED STATES PATENTS

| | | | |
|---|---|---|---|
| 2,245,380 | 6/1941 | Bass | 166—85 |
| 2,615,681 | 10/1952 | True | 166—77.5 |
| 2,885,096 | 5/1959 | De Jarnett | 214—2.5 |
| 3,063,509 | 11/1962 | Guier | 175—85 |

MARVIN A. CHAMPION, *Primary Examiner.*